(12) United States Patent
Wang et al.

(10) Patent No.: US 8,580,440 B2
(45) Date of Patent: Nov. 12, 2013

(54) NON-AQUEOUS ELECTROLYTIC SOLUTION CONTAINING ADDITIVE FOR INCREASING CAPACITY OF LITHIUM-ION CELL AND LITHIUM-ION CELL USING SAME

(75) Inventors: Xianming Wang, Tsukuba (JP); Yoshitsugu Sone, Tsukuba (JP); Saburo Kuwajima, Tsukuba (JP); Kenichi Kuwajima, legal representative, Kanagawa (JP)

(73) Assignee: Japan Aerospace Exploration Agency, Tokyo (JP)

( * ) Notice: Subject to any disclaimer, the term of this patent is extended or adjusted under 35 U.S.C. 154(b) by 0 days.

(21) Appl. No.: 13/086,169

(22) Filed: Apr. 13, 2011

(65) Prior Publication Data

US 2011/0189547 A1 Aug. 4, 2011

Related U.S. Application Data

(63) Continuation of application No. 11/372,091, which is a continuation of application No. PCT/JP03/11633, filed on Sep. 11, 2003, now Pat. No. 8,124,284.

(51) Int. Cl.
*H01M 4/131* (2010.01)

(52) U.S. Cl.
USPC ...................... 429/328; 429/231.95

(58) Field of Classification Search
USPC ............ 429/231.95, 328, 329, 339, 341, 336
See application file for complete search history.

(56) References Cited

U.S. PATENT DOCUMENTS

| 5,443,930 | A | * | 8/1995 | Shoji et al. | 429/224 |
|---|---|---|---|---|---|
| 5,650,244 | A | | 7/1997 | Shoji et al. | |
| 2003/0096169 | A1 | | 5/2003 | Gan et al. | |
| 2006/0172201 | A1 | * | 8/2006 | Yasukawa et al. | 429/329 |
| 2008/0014496 | A1 | | 1/2008 | Watanabe et al. | |

FOREIGN PATENT DOCUMENTS

| EP | 1176658 A2 | 1/2002 |
|---|---|---|
| JP | 01-213969 A1 | 8/1989 |
| JP | 07-078632 A | 3/1995 |
| JP | 08-064238 A | 3/1996 |
| JP | 2000-223151 A | 8/2000 |
| JP | 2001-015158 | 1/2001 |
| JP | 2001-043867 A | 2/2001 |
| JP | 2001-176551 A | 6/2001 |
| JP | 2002-083633 A | 3/2002 |
| JP | 2002-280062 A | 9/2002 |
| JP | 2003-187789 A | 7/2003 |
| JP | 2003-243027 A | 8/2003 |
| JP | 2003234127 * | 8/2003 |
| JP | 2003-297424 A | 10/2003 |

* cited by examiner

*Primary Examiner* — Mark F Huff
*Assistant Examiner* — Monique Wills
(74) *Attorney, Agent, or Firm* — Westermann, Hattori, Daniels & Adrian, LLP (57) ABSTRACT

Disclosed are an additive for improving charge/discharge characteristics of a lithium-ion cell, a nonaqueous electrolytic solution containing the additive, and a lithium-ion cell using the additive and/or the nonaqueous electrolytic solution. The additive serves as a solvent for a fluorine resin, such as poly (vinylidene fluoride), which is incorporated as an adhesive in a positive electrode containing a lithium-transition metal oxide capable of absorbing and releasing lithium and a negative electrode containing a carbon material capable of absorbing and releasing lithium. The additive comprises three compounds selected, respectively, from a 2-pyrrolidinone compound group, a cyclic alkyl compound group, and a cyclic pentanone compound group.

5 Claims, 4 Drawing Sheets

NON-AQUEOUS ELECTROLYTIC SOLUTION CONTAINING ADDITIVE FOR INCREASING CAPACITY OF LITHIUM-ION CELL AND LITHIUM-ION CELL USING SAME

This is a CONTINUATION of U.S. application Ser. No. 11/372,091 filed Mar. 6, 2006 now U.S. Pat. No. 8,124,284 which is a CONTINUATION of PCT/JP2003/011633 filed 11 Sep. 2003 and published in Japanese, the disclosures of each of which are hereby incorporated by reference.

TECHNICAL FIELD

The present invention relates to an additive capable of minimizing a first-cycle irreversible capacity of a carbon negative electrode for a lithium-ion cell to increase the capacity of the lithium-ion cell. The present invention also relates to a nonaqueous electrolytic solution containing the additive, and a lithium-ion cell using the nonaqueous electrolytic solution.

BACKGROUND ART

A lithium-ion cell with advantageous features, such as a high energy density and a high operating voltage, has been increasingly used in electronics/communication devices, such as portable phones, digital cameras and personal computers. Further, the lithium-ion cell is expected to be utilized as large-capacity power sources for a satellite, a rocket, an electric vehicle and a nighttime-power storage-based power-load leveling system.

In lithium-ion cells, a carbon-based material capable of absorbing and releasing lithium ions, a lithium-transition metal oxide capable of absorbing and releasing lithium ions, and a nonaqueous solvent such as a carbonate-based solvent with a lithium salt dissolved therein, are used, respectively, in a negative-electrode active material, a positive-electrode active material and an electrolytic solution thereof. Typically, highly crystalline carbon such as graphite, lithium cobaltate ($LiCoO_2$), and a cyclic and/or chain carbonate solvent with lithium fluorophosphate ($LiPF_6$) dissolved therein, are actually used, respectively, in the negative electrode, the positive electrode and the electrolytic solution. The lithium-ion cell is charged in such a manner that lithium is released from the positive electrode into the nonaqueous electrolytic solution, and lithium ions in the nonaqueous electrolytic solution are absorbed into the negative electrode separated from the positive electrode by a micro-porous separator. In a discharge process, the reverse phenomenon is generated to allow electrons to be extracted by an external circuit. Thus, a capacity of the lithium-ion cell is related to a quantity of ions to be absorbed and released between the positive and negative electrodes.

In conjunction with the above charging/discharging reactions, an irreversible decomposition of the nonaqueous electrolytic solution and/or the lithium salt occurs on respective surfaces of the negative and positive electrodes to cause consumption of lithium ions to be absorbed and released. A quantity of lithium ions consumed in the charge/discharge cycles corresponds to an irreversible capacity of the cell. Particularly, during a charge process in the first cycle, a passive film, so-called "solid electrolyte interphase (SEI)", is formed on a surface of the carbon-based negative electrode, and the resulting irreversible capacity has a great impact on an energy density of the lithium-ion cell. Further, a reductive decomposition of the electrolytic solution occurs on the surface of the negative electrode in proportion to a contact area between the negative electrode and the electrolytic solution. Thus, if the contact area between the negative electrode and the electrolytic solution becomes larger due to expansion of the active material particles of the negative electrode during the charge process, the irreversible capacity will be undesirably increased. When the first-cycle irreversible capacity becomes larger, a ratio of a charge capacity to a discharge capacity (i.e. charge/discharge efficiency) will become lower, and a cell capacity in the second and subsequent cycles will become smaller. Therefore, minimization of the first-cycle irreversible capacity is essential for achieving a high energy density in lithium-ion cells.

Heretofore, in order to reduce the first-cycle irreversible capacity, there have been proposed the following two mainstream measures. One measure is to incorporate an easily-reducible additive into a nonaqueous electrolytic solution. During a charge process, this type of additive can form an unstable passive film on a surface of a negative electrode before a nonaqueous solvent and a lithium salt are reductively decomposed on the negative-electrode surface. This passive film has an electrical insulation performance, and serves as means to block an electrical contact between the negative electrode and the nonaqueous solvent/lithium salt. This makes it possible to suppress the reductive decomposition of the nonaqueous solvent and the lithium salt on the negative-electrode surface so as to reduce a first-cycle irreversible capacity of a cell. For example, Japanese Patent Laid-Open Publication Nos. 2000-348768 and 2000-294282 disclose a technique of incorporating an additive consisting of a nitrate ester, such as isopropyl nitrate, or a sulfite ester, such as alkyl sulfite, into a nonaqueous electrolytic solution, so as to improve a first-cycle charge/discharge efficiency of a lithium-ion cell.

The other measure is to incorporate directly into a carbon-based negative electrode an additive consisting of a different type of carbon-based material, so as to suppress a volume expansion of the carbon-based negative electrode during a charge process to reduce a first-cycle irreversible capacity. For example, Japanese Patent Laid-Open Publication No. 11-73965 proposes a technique of adding fluorocarbon to a carbon-based negative electrode so as to reduce a first-cycle irreversible capacity of a lithium-ion cell.

However, the above two measures are not sufficient to adequately reduce a first-cycle irreversible capacity, and by no means satisfactory from a practical standpoint.

Thus, there is a strong need for providing a nonaqueous electrolytic solution containing an additive capable of suppressing a first-cycle irreversible capacity, based on a new concept from a standpoint of improving energy density and charge/discharge cycle characteristics of a lithium-ion cell.

DISCLOSURE OF THE INVENTION

In view of the above problems, it is therefore an object of the present invention to provide a nonaqueous electrolytic solution for a lithium-ion cell having a high energy density and excellent charge/discharge cycle characteristics, and a lithium-ion cell using the nonaqueous electrolytic solution.

In order to achieve the above object, through various researches for bringing about breakthrough with a focus on the fact that a reductive decomposition of an electrolytic solution occurs on a surface of a negative electrode in proportion to a contact surface between the electrolytic solution and the negative electrode, the inventors created a new concept of adding a compound serving as a solvent for a fluorine resin such as poly(vinylidene fluoride) incorporated in positive and negative electrode as an adhesive, to a nonaqueous electrolytic solution to allow the adhesive to have enhanced cohesion to the particles of an electrode active material so as to maintain a contact surface between the adhesive and the particles of the electrode active material irrespective of volume expansion in the positive and negative electrodes during a charge process in the first cycle, to suppress the reductive decomposition of the electrolytic solution on the negative-electrode surface. Then, in the experimental tests, the inventors found that the nonaqueous electrolytic solution based on the above new concept can drastically improve the energy density and charge/discharge cycle characteristics of a lithium-ion cell at astoundingly high level to achieve the above object. Based on this knowledge, the inventors have finally reached the present invention.

Specifically, the present invention provides: an additive serving as a solvent for a fluorine resin incorporated as an adhesive in a positive electrode containing a lithium-transition metal oxide capable of absorbing and releasing lithium and a negative electrode containing a carbon material capable of absorbing and releasing lithium; a nonaqueous electrolytic solution comprising a lithium salt and an nonaqueous solvent, and added with the additive; and a lithium-ion cell comprising the nonaqueous electrolytic solution. The additive comprises three compounds selected, respectively, from a 2-pyrrolidinone compound group represented by the following formula (I), a cyclic alkyl compound group represented by the following formula (II), and a cyclic pentanone compound group represented by the following formula (III), to

(I)

wherein $R^1$ represents a hydrogen atom or a straight-chain or branched-chain alkyl group having 1 to 4 carbon atoms, (II)

wherein $R^2$ represents a straight-chain or branched-chain alkylene group having 2 to 4 carbon atoms,

(III)

wherein $R^3$ represents a straight-chain or branched-chain alkylene group having 1 to 3 carbon atoms.

Specifically, the present invention provides: an additive serving as a solvent for a fluorine resin incorporated as an adhesive in a positive electrode containing a lithium-transition metal oxide capable of absorbing and releasing lithium and a negative electrode containing a carbon material capable of absorbing and releasing lithium; a nonaqueous electrolytic solution comprising a lithium salt and an nonaqueous solvent, and added with the additive; and a lithium-ion cell comprising the nonaqueous electrolytic solution. The additive comprises three compounds selected, respectively, from a 2-pyrrolidinone compound group represented by the following formula (I), a cyclic alkyl compound group represented by the following formula (II), and a cyclic pentanone compound group represented by the following formula (III), In the nonaqueous electrolytic solution of the present invention, each of the three additives may be added to the lithium salt-containing electrolytic solution in an amount of 0.1 to 10% (by weight).

In the nonaqueous electrolytic solution of the present invention, the lithium salt may consist of at least one or a combination of two or more selected from the group consisting of lithium salts of inorganic acid formed from a lithium ion and an anion selected from $PF_6$ and $BF_4$; and lithium salts of organic acid formed from a lithium ion and an anion selected from those represented by the following general formula (IV), (IV)

wherein m and n each independently represents an integer selected from 1 to 4.

Further, the lithium salt may be contained in the nonaqueous solvent in a total concentration of 1.5 to 2.5 mol/dm³.

In the nonaqueous electrolytic solution of the present invention, the nonaqueous solvent may comprise two or more compounds selected from the group consisting of a carbonate-based compound, a lactone-based compound, an ether-based compound, a sulfolane-based compound, a dioxolan-based compound, a chain phosphate ester-based compound represented by the following general formula (V), and a cyclic phosphate ester-based compound represented by the following general formula (VI), (V)

wherein $R^4$, $R^5$ and $R^6$ each independently represents an alkyl group having 1 or 2 carbon atoms in which each of hydrogen atoms may be substituted with fluorine, (VI)

wherein $R^7$ represents an alkyl group having 1 or 2 carbon atoms in which each of hydrogen atoms may be substituted with fluorine, and $R^8$ represents an alkylene group having 2 to 4 carbon atoms.

The lithium-ion cell of the present invention comprises: a positive electrode containing a lithium-transition metal oxide capable of absorbing and releasing lithium; a negative electrode containing a carbon-based material capable of absorbing and releasing lithium; a fluorine resin including poly(vinylidene fluoride) incorporated in the positive and negative electrodes as an adhesive; the above additive; and the above nonaqueous electrolytic solution.

BEST MODE FOR CARRYING OUT THE INVENTION

The present invention will now be specifically described. Firstly, an additive and a nonaqueous electrolytic solution of the present invention will be described in detail based on a preferred embodiment thereof.

The additive of the present invention to be added to the nonaqueous electrolytic solution comprises three compounds selected, respectively, from the 2-pyrrolidinone compound group represented by the aforementioned (I), the cyclic alkyl compound group represented by the aforementioned formula (II), and the cyclic pentanone compound group represented by the aforementioned formula (III).

Each of the three additives is added to the lithium salt-containing electrolytic solution, preferably, in an amount of 0.1 to 10% (by weight), particularly preferably in an amount of 0.2 to 5.0% (by weight). If each of the additives is added in an amount of less than 0.1% (by weight), a volume expansion of the electrodes, particularly the negative electrode, during a charge process, cannot be effectively suppressed, to cause difficulty in sufficiently reducing a first-cycle irreversible capacity and improving energy density and charge/discharge cycle characteristics of a lithium-ion cell. If each of the additives is added in an amount of greater than 10% (by weight), the fluorine resin incorporated in the positive and negative electrode as an adhesive is undesirably dissolved to increase the impedance of the electrodes and cause the risk of deterioration in charge/discharge characteristics of a lithium-ion cell.

The additive of the present invention may be added to the nonaqueous electrolytic solution in the form of a mixture with an additional additive to provide further improved charge/discharge characteristics of a lithium-ion cell. This additional additive is not limited to a specific type. For example, the additional additive may include: vinylene carbonate compounds represented by following formula (VII), such as vinylene carbonate; vinyl acetate compounds represented by the following formula (VIII), such as vinyl acetate; alkyl methyl carbonate compounds represented by the following formula (IX); vinyl ethylene carbonate compounds represented by the following formula (X), such as vinyl ethylene carbonate; nitrate ester compound represented by the following formula (XI), such as propyl nitrate; and sulfite ester compound represented by the following formula (XII), such as diallyl sulfite; and a mixture of two or more of them, (VII)

wherein $R^9$ and $R^{10}$ each independently represents a hydrogen atom or a straight-chain or branched-chain alkyl group having 1 to 4 carbon atoms, (VIII)

wherein $R^{11}$, $R^{12}$ and $R^{13}$ each independently represents a hydrogen atom or a straight-chain or branched-chain alkyl group having 1 to 4 carbon atoms, (IX)

wherein $R^{14}$ represents a hydrogen atom or a straight-chain or branched-chain alkyl group having 1 to 4 carbon atoms, (X)

wherein $R^{15}$, $R^{16}$, $R^{17}$, $R^{18}$, $R^{19}$ and $R^{20}$ each independently represents a hydrogen atom or a straight-chain or branched-chain alkyl group having 1 to 4 carbon atoms, (XI)

wherein $R^{21}$ represents a straight-chain or branched-chain alkyl group having 1 to 4 carbon atoms, (XII)

wherein $R^{22}$ represents a hydrogen atom or a straight-chain or branched-chain alkyl group having 1 to 4 carbon atoms, and $R^{23}$ represents a straight-chain or branched-chain alkyl group having 1 to 4 carbon atoms.

The lithium salt in the nonaqueous electrolytic solution of the present invention may be a lithium salt of inorganic acid including lithium fluorophosphate ($LiPF_6$), lithium fluoborate ($LiBF_4$) and lithium perchlorate ($LiClO_4$). Among them, $LiPF_6$ and $LiBF_4$ are preferable in view of superiority in charge/discharge characteristics of a lithium-ion cell.

The lithium salt in the nonaqueous electrolytic solution of the present invention may be a lithium salt of organic acid including a lithium imide salt formed from a lithium ion and an anion selected from those represented by the aforementioned general formula (IV). Among them, LiN $(SO_2C_2F_5)_2$ and LiN $(SO_2CF_3)(SO_2C_4F_9)$ are preferable in view of superiority in charge/discharge characteristics of a cell.

Preferably, the lithium salt is contained in the nonaqueous electrolytic solution in a concentration of 0.5 to 2.5 mol/dm$^3$, particularly dissolved in the phosphate ester-based solvent to have a concentration of 0.8 to 2.2 mol/dm$^3$. If a concentration of the lithium salt in the nonaqueous electrolytic solution is less than 0.5 mol/dm$^3$, an electrical conductivity of the non-aqueous electrolytic solution becomes lower to cause difficulty in sufficiently improving charge/discharge characteristics of a lithium-ion cell. If a concentration of the lithium salt is greater than 2.5 mol/dm$^3$, an association phenomenon of lithium ions occurs in the nonaqueous electrolytic solution, and an electrical conductivity of the nonaqueous electrolytic solution becomes lower to case deterioration in charge/discharge characteristics of a lithium-ion cell under a high charge/discharge rate.

The nonaqueous solvent in the nonaqueous electrolytic solution of the present invention is not limited to a specific type. For example, the nonaqueous solvent may include: a carbonate-based compound, such as ethylene carbonate, diethyl carbonate, methyl ethyl carbonate, dimethyl carbonate, propylene carbonate or vinylene carbonate; lactone-based compound, such as γ-butyrolactone; an ether-based compound, such as 1,3-dioxane or monogrime; a sulfolane-based compound, such as sulfolane; a dioxolan-based compound, such as 1,3-dioxolan; a ketone-based compound, such as 4-methyl-2-pentanone; a nitrile-based compound, such as acetonitrile, propionitrile, butyronitrile, valeronitrile or benzonitrile; a halogenated hydrocarbon-based compound, such as 1,2-dichloroethane; a chain phosphate ester-based compound represented by the aforementioned general formula (V), such as trimethyl phosphate or dimethyl phosphate ester; and a cyclic phosphate ester-based compound represented by the aforementioned general formula (VI), such as ethylene methyl phosphate; methyl sulfamate; dimethyl formamide; dimethyl thioformamide; and dimethyl sulfoxide; and a mixture of two or more of them. Among them, γ-butyrolactone and ethylene carbonate are preferable in view of a high flash point, a high dielectric constant and advantageous properties for charge/discharge characteristics of a lithium-ion cell. Further, trimethyl phosphate is preferable because it is a non-flammable nonaqueous solvent excellent in safety A lithium-ion cell of the present invention will be described in detail below. The lithium-ion cell of the present invention comprises the above nonaqueous electrolytic solution, a positive electrode containing a lithium-transition metal oxide capable of absorbing and releasing lithium, and a negative electrode containing a carbon-based material capable of absorbing and releasing lithium, and a fluorine resin, such as poly(vinylidene fluoride), incorporated in the positive and negative electrodes as an adhesive. Except for the additive serving as a solvent for the fluorine resin incorporated as an adhesive in the positive and negative electrodes of the lithium-ion cell, each of the components of the present invention, such as the positive electrode, the negative electrode, the fluorine resin, a separator, the lithium salt and the nonaqueous solvent, is not limited to a specific material, and may be made of any material used in conventional lithium-ion cells without modification.

For example, a positive-electrode active material constituting the positive electrode includes a lithium transition metal oxide-based material, such as lithium manganese oxide ($LiMn_2O_4$), lithium cobalt oxide ($LiCoO_2$), lithium nickel oxide ($LiNiO_2$) or lithium titanium oxide ($Li_{4/3}Ti_{5/3}O_4$). The positive electrode is not limited to a specific shape. For example, the positive electrode may be a sheet-shaped electrode prepared by mixing a conductive material and the fluorine resin as an adhesive and applying the mixture onto a collector, or may be a pellet-shaped electrode prepared by subjecting the mixture to a press forming process. A positive-electrode collector may be made of aluminum or alloy thereof. Among them, aluminum is particularly preferable in view of lightweight and high electrochemical stability.

For example, a negative-electrode active material constituting the negative electrode includes graphite, surface-treated graphite, amorphous carbon and non-graphitizable carbon (hard carbon). Among them, surface-treated graphite is particularly preferable in view of high energy density. These negative-electrode active materials may be used in the form of a mixture of two or more of them. The negative electrode is not limited to a specific shape, but may be a sheet-shaped electrode prepared by mixing a conductive material and the fluorine resin as an adhesive and applying the mixture onto a collector, or a pellet-shaped electrode prepared by subjecting the mixture to a press forming process. A negative-electrode collector may be made of metal, such as copper, nickel or porous nickel, or alloy thereof. Among them, copper and porous nickel is particularly preferable in view of high formability to a thin film and high electrochemical stability.

A material of the separator includes a nonwoven, or a porous film made of polyolefin, such as polyethylene or polypropylene.

Figure 1:
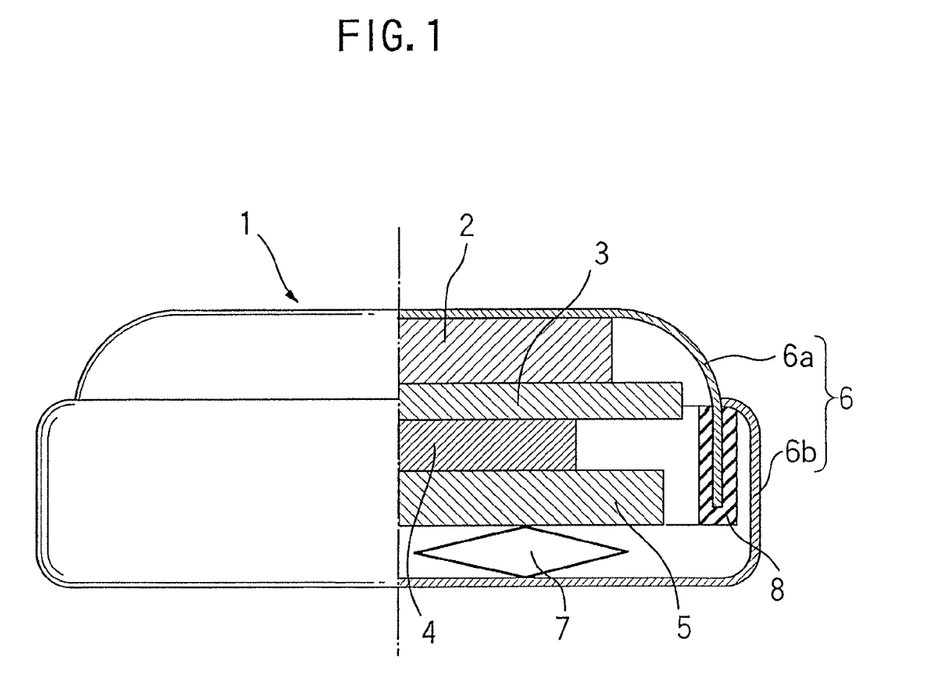
FIG. 1 is a sectional view showing the structure of a coin-shaped lithium-ion cell serving as a test sample.

The lithium-ion cell of the present invention is not limited to a specific shape, but may be formed in any suitable conventional shape, such as a flat shape (button-like shape), a cylindrical shape or a rectangular shape. FIG. 1 shows one example of a coin-shaped lithium-ion cell using the nonaqueous electrolytic solution of the present invention.

As shown in FIG. 1, in this lithium-ion cell 1, a disc-shaped positive electrode 2 is disposed on the upper side of the cell 1, and a disc-shaped negative electrode 4 is disposed below the positive electrode 2 while interposing a disc-shaped separator 3 therebetween. Further, a spacer 5 is disposed below the negative electrode 4. The positive electrode 2, the separator 3, the negative electrode 4 and the spacer 5 are stacked in this order to form a cell body, and housed in a hermetically-sealed coin-shaped case 6. A spring 7 is interposed between the spacer 5 and a bottom surface of the case 6 to upwardly bias the cell body with a laminated structure comprised of the positive electrode 2, the separator 3, the negative electrode 4 and the spacer 5, so as to allow a top surface of the positive electrode 2 to be kept in contact with an upper inner surface of the case 6. A ring-shaped gasket 8 having a vertically-elongated rectangular shape in section (in FIG. 1) is disposed in the case 6. The case 6 is formed by joining a cup-shaped upper case 6a and a cup-shaped lower case 6b together along their peripheral edges while receiving the cell body composed of the positive electrode 2, the separator 3, the negative electrode 4 and the spacer 5, in an inner space of the case 6. The gasket 8 is provided as a means to hermetically seal the joined portion between the upper and lower cases 6a, 6b and electrically insulate between the positive and negative electrodes.

Typically, in the coin-shaped lithium-ion cell as shown in FIG. 1, LiCoO$_2$ and graphite are used, respectively, in the positive electrode and the negative electrode. In this case, a charge reaction is expressed as follows:

Positive Electrode: LiCoO$_2$→Li$_{1-x}$CoO$_2$+$x$Li$^+$+$xe^-$ [1]

Negative Electrode: 6C+$x$Li$^+$+$xe^-$→Li$x$C$_6$ [2]

Respective discharge reactions in the positive and negative electrodes are induced in the opposite directions of the [1] and [2]. Typically, in a performance evaluation of one of the positive and negative electrodes, either one of the positive and negative electrodes is substituted with a lithium metal (Li) electrode as a counter electrode, and a positive half-cell of Li/LiCoO$_2$ or a negative half-cell of Li/graphite is used. The object of the present invention is to suppress reductive decomposition of the solvent etc., on a surface of the graphite negative electrode based on the additive, optimization of solute concentration, etc., so as to provide a lithium-ion cell having enhanced charge/discharge characteristics. In the present invention, a performance evaluation was conducted using a Li/graphite negative half-cell. Charge/discharge reactions in the graphite negative electrode are expressed as follows:

Discharge: Li$x$C$_6$→6C+$x$Li$^+$+$xe^-$ [3]

Charge: 6C+$x$Li$^+$+$xe^-$→Li$x$C$_6$ [4]

In this cell, a porous film was used as the separator. The separator was impregnated with the electrolytic solution. As mentioned above, a case 6 for housing a cell body had an upper case 6a and a lower case. After setting cell components in the case, the case was hermetically sealed using a crimping machine. A gasket was also used for ensuring fluid-tightness of the cell.

While the following description will be made in connection with specific examples, the present invention is not limited to the specific example, but the scope of the invention should be determined by the appended claims and their legal equivalents. Respective performances of an electrolytic solution and a cell were evaluated by the following method.

1. Measurement of Electrical Conductivity of Electrolytic Solution: An electrical conductivity was measured at 20° C. using a conductivity meter (CM-20J "Electrical Conductivity Meter" produced by DKK-TOA Co., Japan) and a cell (C-50101B "Cell for Electrical Conductivity" produced by DKK-TOA Co.).

2. Preparation of Lithium-ion Cell: A positive electrode was prepared as follows. Acetylene black serving as a conductive material was homogenously mixed with lithium cobalt oxide (LiCoO$_2$) serving as a positive-electrode active material. The obtained mixture was dispersed in N-methyl-2-pyrrolidinone as a solvent for a fluorine resin serving as an adhesive, and stirred. A weight ratio of the lithium cobalt oxide: the acetylene black:the fluorine resin was 90:5:5. After the mixture was formed as homogenous slurry, the slurry was applied onto one surface of an aluminum foil serving as a collector to obtain a positive electrode sheet. This positive electrode sheet was placed on a heat plate heated at 80° C., and dried for 10 minutes. Then, the dried positive electrode sheet was stored in a dry atmosphere.

A negative electrode was prepared as follows. A carbon-based material serving as a negative-electrode active material was dispersed in N-methyl-2-pyrrolidinone as a solvent for poly(vinylidene fluoride) serving as adhesive, and stirred. A weight ratio of the carbon-based material:the fluorine resin was 95:5. After the mixture was formed as homogenous slurry, the slurry was applied onto one surface of a copper foil serving as a collector to obtain a negative electrode sheet. This negative electrode sheet was placed on a heat plate heated at 80° C., and dried for 10 minutes. Then, the dried negative electrode sheet was stored in a dry atmosphere.

Each of the obtained positive and negative sheets was formed into a disc-shaped electrode having a diameter of 12 mm, using a punching machine. A polyethylene multilayer film was formed into a disc-shaped separator having a diameter of 18 mm, using a punching machine. Further, a lithium metal foil was formed into a disc-shaped electrode having a diameter of 14 mm, using a punching machine under a dry argon atmosphere. Finally, under a dry argon atmosphere, the obtained disc-shaped electrodes and the separator were hermetically housed in a con-shaped case to obtain a positive-negative coin-shaped lithium-ion cell. The coin-shaped case had a diameter of 20 mm and a height of 3.2 mm. Further, a positive lithium half-cell or a negative lithium half-cell was prepared.

4. Evaluation of Cell Charge/Discharge Characteristics: A cell charging operation was performed under a constant current-constant voltage mode, and a cell discharging operation was performed under a constant current mode. A constant-voltage charge period was set at 3 hours. A current rate in each of the cell charging and discharging operations was 0.2 C, unless otherwise specifically described. A cutoff voltage for the negative half-cell was set at 10 mV and 1.5V. An ambient temperature of the cells was 20° C.

With reference to the following Table 1, each of Comparative Examples and Inventive Examples will be described. As described above, a protective film is formed on a surface of a negative electrode during a charge process in the first charge/discharge cycle of a lithium-ion cell to cause reduction of a part of lithium ions as a cell active material and deterioration in the ratio of a discharge capacity to a charge capacity (charge/discharge efficiency). Thus, in the evaluation of cell characteristics, the charge/discharge efficiency and the discharge capacity are two key factors. As shown in Table 1, a plurality of negative half-cells using respective electrolytic solutions were prepared, and respective charge/discharge efficiencies and discharge capacities based on the electrolytic solutions were compared with each other.

Each brevity code in the Table 1 represents the following compound:

LiPF6: fluorinated lithium phosphate EC: ethylene carbonate
DEC: diethyl carbonate CH: cyclohexane
NMP: N-methyl-2-pyrrolidinone CP: cyclopentanone

TABLE 1

| | No | Electrolytic solution Solute *1 | Electrolytic solution Solvent *2 | Electrolytic solution Additive *3 | Cell Characteristics *5 Initial discharge capacity (mAh) | Cell Characteristics *5 Initial charge/ discharge efficiency (%) | Cell Characteristics *5 Discharge Capacity Maintenance Ratio (%) *4 | Conductivity (mS/cm) |
|---|---|---|---|---|---|---|---|---|
| Inventive Example | 1 | 1 mol/dm³ LiPF₆ | DE + DEC (1:2) | 2% CH | 1.76 | 91 | 101 | 8.5 |
| | 2 | 1 mol/dm³ LiPF₆ | DE + DEC (1:2) | 5% CH | 1.77 | 91 | 100 | 8.4 |
| | 3 | 1 mol/dm³ LiPF₆ | DE + DEC (1:2) | 10% CH | 1.66 | 89 | 107 | 8.6 |
| | 4 | 1 mol/dm³ LiPF₆ | DE + DEC (1:2) | 2% NMP | 1.76 | 92 | 101 | 8.5 |
| | 5 | 1 mol/dm³ LiPF₆ | DE + DEC (1:2) | 5% NMP | 1.76 | 91 | 101 | 8.4 |
| | 6 | 1 mol/dm³ LiPF₆ | DE + DEC (1:2) | 10% NMP | 1.62 | 92 | 108 | 8.5 |
| | 7 | 1 mol/dm³ LiPF₆ | DE + DEC (1:2) | 2% CP | 1.75 | 92 | 101 | 8.7 |
| | 8 | 1 mol/dm³ LiPF₆ | DE + DEC (1:2) | 5% CP | 1.74 | 91 | 100 | 8.5 |
| | 9 | 1 mol/dm³ LiPF₆ | DE + DEC (1:2) | 10% CP | 1.66 | 90 | 106 | 8.6 |
| Comparative Example | 1 | 1 mol/dm³ LiPF₆ | DE + DEC (1:2) | — | 1.73 | 83 | 99.3 | 8.5 |

Figure 2:
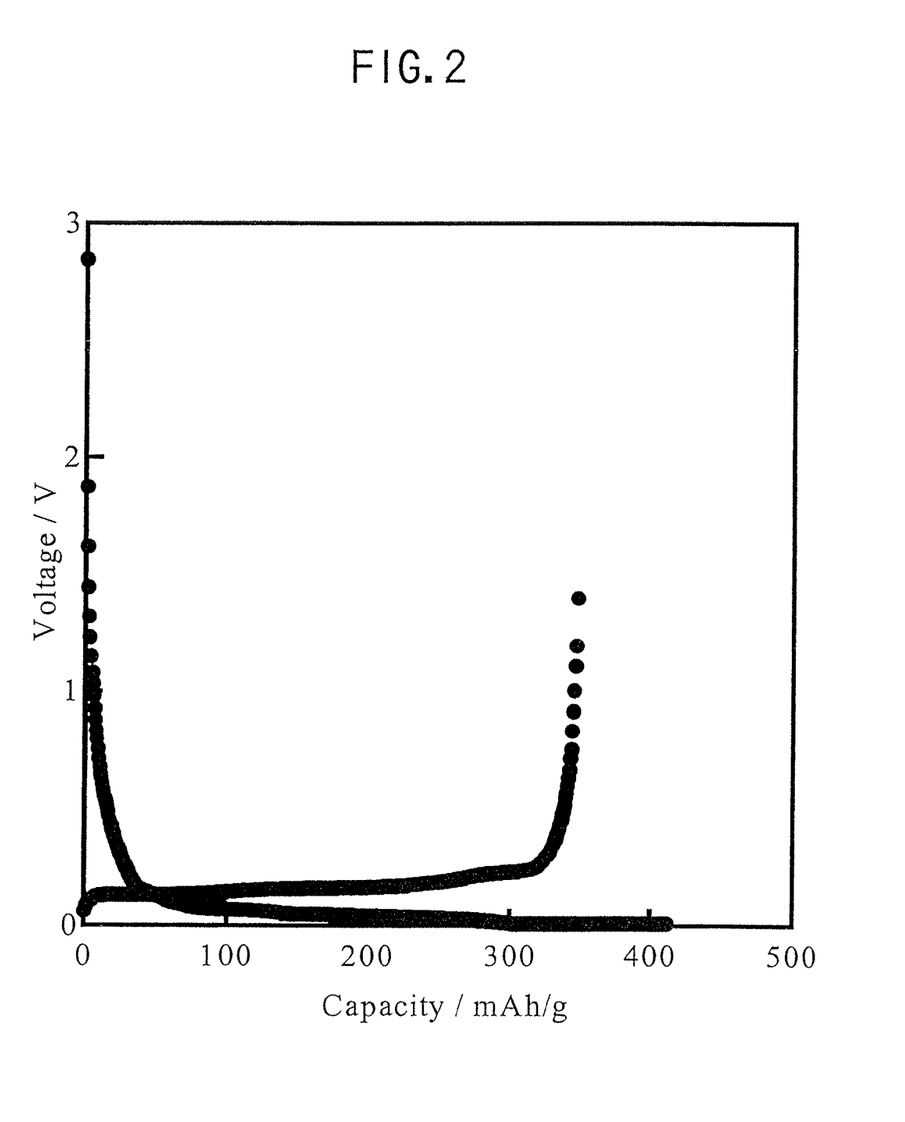
FIG. 2 is a graph showing a first-cycle charge/discharge curve of a negative half-cell using a 1 mol/dm$^3$ LiPF$_6$/EC+DEC (1:2) electrolytic solution in Comparative Example 1.

*1: Mol concentration to volume of solute and solvent
*2: Volume ratio between two solvents
*3: Weight ratio of additive to total of solute and solvent
*4: Percentage of discharge capacity in 10th cycle to discharge capacity in 1st cycle
*5: Charge/discharge characteristics in 1st cycle of negative half-cell The electrolytic solution in Comparative Example 1 is 1 mol/dm³ LiPF₆/EC+DEC (1:2) which is used in a commercially-available lithium-ion cell. FIG. 2 shows first-cycle charge/discharge characteristics in the graphite negative electrode using this conventional electrolytic solution. Comparative Example 1 has a charge/discharge efficiency of 83% due to reduction between the electrolytic solution and a part of lithium ions caused by a protective film formed on a surface of the graphite negative electrode.

Figure 3:
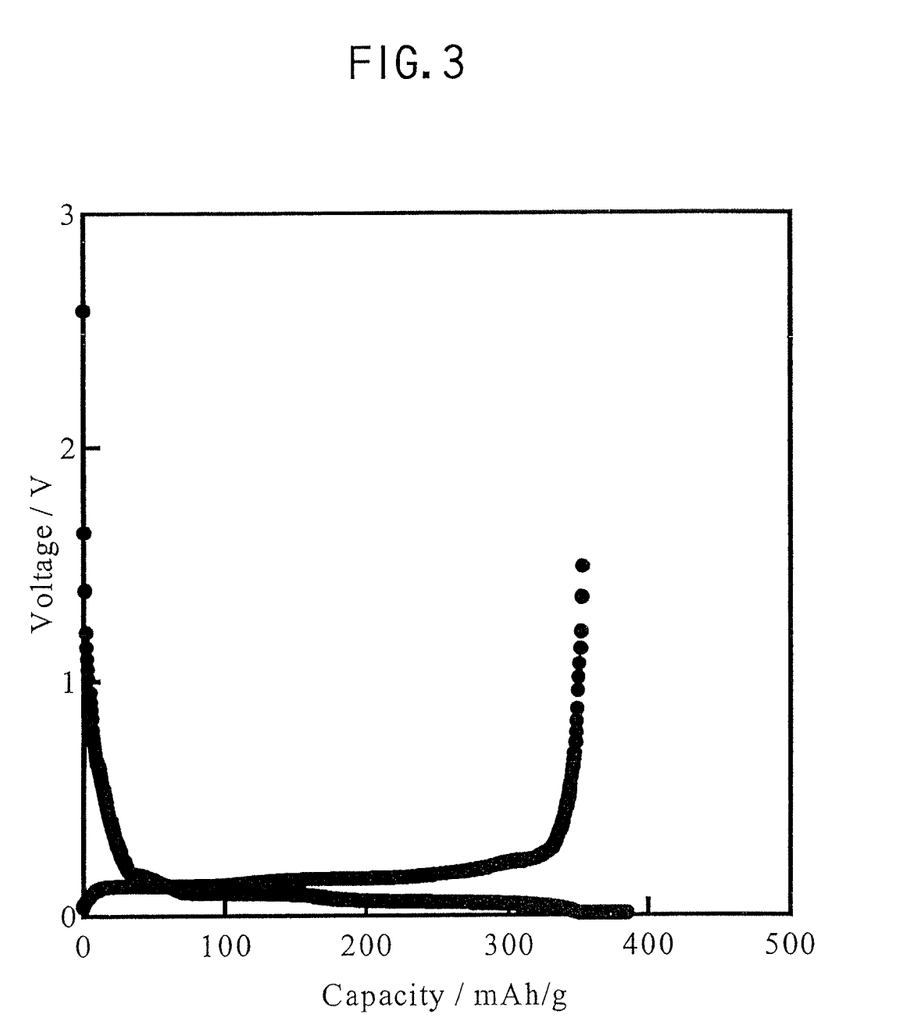
FIG. 3 is a graph showing a first-cycle charge/discharge curve of a negative half-cell using a 1 mol/dm$^3$ LiPF$_6$/EC+DEC (1:2) electrolytic solution added with 2% CH in Inventive Example 1.
Figure 4:
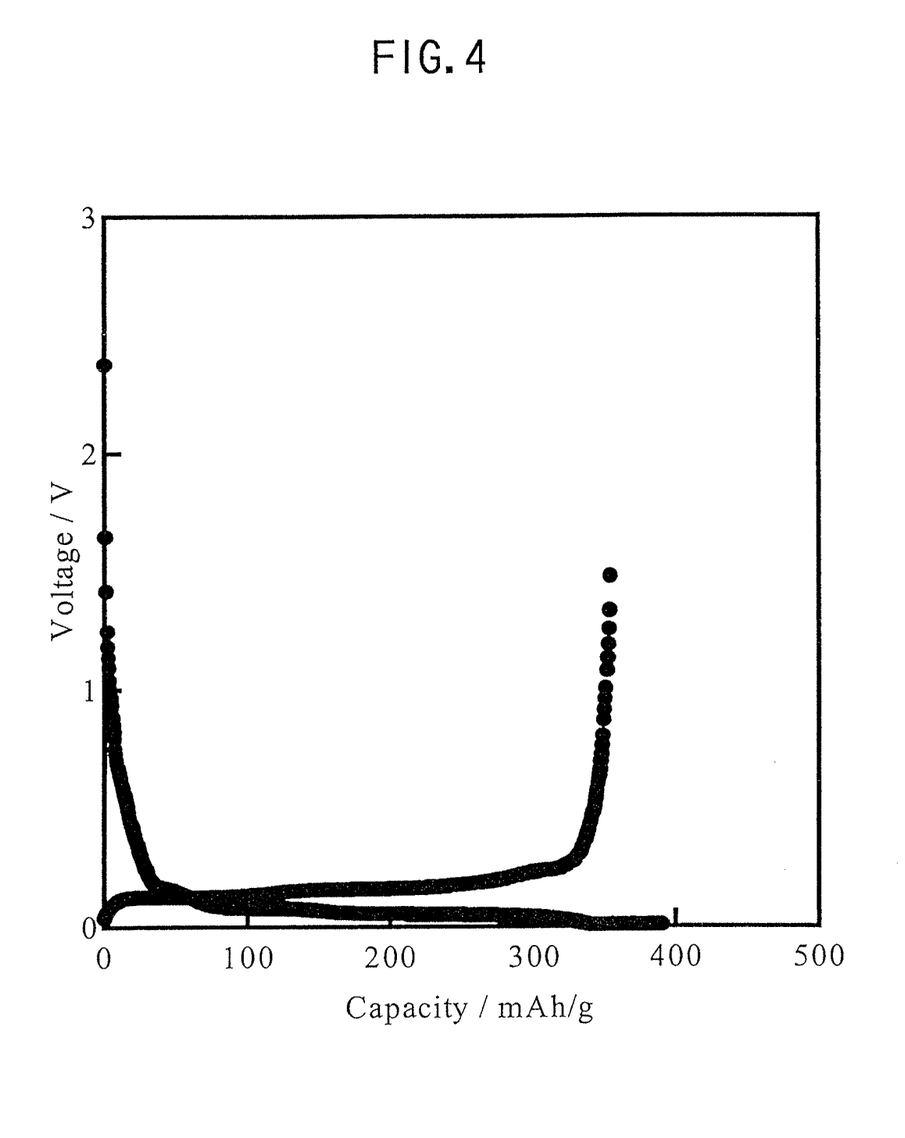
FIG. 4 is a graph showing a first-cycle charge/discharge curve of a negative half-cell using a 1 mol/dm$^3$ LiPF$_6$/EC+DEC (1:2) electrolytic solution added with 2% NMP in Inventive Example 4.

The electrolytic solution in Inventive Example 1 was prepared by adding 2% CH to the 1 mol/dm³ LiPF₆/EC+DEC (1:2) electrolytic solution (FIG. 3). In Inventive Example 1, a charge capacity is reduced, and a discharge capacity is slightly increased. This means that an irreversible capacity during a charge process in the first cycle is reduced by the addition of CH. As a result, the charge/discharge efficiency in the negative half-cell becomes higher, because the CH serves as a solvent for the poly(vinylidene fluoride) incorporated in the negative electrode as an adhesive, to improve the cohesive of the poly(vinylidene fluoride), as described above. This makes it possible to reduce an amount of lithium ions and electrolytic solution to be reductively decomposed or consumed by the formation of a protective film on the negative-electrode surface, so as to provide lowered irreversible capacity and increased charge/discharge efficiency.

The electrolytic solutions in Inventive Examples 2 and 3 were prepared, respectively, by adding 5% CH and 10% CH to the 1 mol/dm³ LiPF₆/EC+DEC (1:2) electrolytic solution. An effect of CH addition depends on an amount of CH to be added. When CH is added in an amount of 10%, the discharge capacity is apt to be lowered.

The electrolytic solutions in Inventive Examples 4 to 6 were prepared, respectively, by adding 2% NMP, 5% NMP and 10% NMP to the 1 mol/dm³ LiPF₆/EC+DEC (1:2) electrolytic solution. While the charge/discharge efficiency and charge capacity are increased when CH is added in an amount of 2% (FIG. 3), the discharge capacity is apt to be lowered when CH is added in an amount of 10%. The NMP serves as a solvent for the poly(vinylidene fluoride) incorporated in the negative electrode as an adhesive, to reduce an amount of lithium ions and electrolytic solution to suppress the decomposition of the electrolytic solution on the graphite negative-electrode surface based on the same mechanism as that in the CH, so as to provide enhanced charge/discharge characteristics.

The electrolytic solutions in Inventive Examples 7 to 9 were prepared, respectively, by adding 2% CP, 5% CP and 10% CP to the 1 mol/dm³ LiPF₆/EC+DEC (1:2) electrolytic solution. The CP serves as a solvent for the poly(vinylidene fluoride) incorporated in the negative electrode as an adhesive, and exhibits an effect of addition similar to those of CH and NMP.

As mentioned above, the additive for increasing the capacity of a lithium-ion cell, and the nonaqueous electrolytic solution containing this additive, make it possible to achieve drastically enhanced charge/discharge characteristics of a lithium-ion cell. The present invention has an excellent particular effect of improving charge/discharge characteristics of a lithium-ion cell.

What is claimed is:
1. A nonaqueous electrolytic solution for a lithium-ion cell containing a nonaqueous solvent and a lithium salt dissolved therein, serving as a solvent for a fluorine resin used as an adhesive of positive and negative electrodes, the electrolytic solution comprising an additive containing a 2-pyrrolidinone compound represented by the following formula (I),

(I)

wherein $R^1$ represents a hydrogen atom or a straight-chain or branched-chain alkyl group having 1 to 4 carbon atoms, wherein said additive is added in an amount such that the compound is present in an amount of 0.1 to 10.0% (by weight) based on the amount of said nonaqueous electrolytic solution containing a lithium salt dissolved therein, and further wherein said nonaqueous solvent comprises a carbonate-based compound.

2. The nonaqueous electrolytic solution of claim 1, wherein said lithium salt is one salt or a combination of two or more salts selected from the group consisting of lithium salts of inorganic acids formed from a lithium ion and an anion selected from $PF_6$ and $BF_4$, and lithium salts of organic acids formed from a lithium ion and an anion selected from those represented by the following general formula (IV):

(IV)

wherein m and n each independently represents an integer selected from 1 to 4.

3. The nonaqueous electrolytic solution of claim 1, wherein said lithium salt contained in said nonaqueous solvent is in a total concentration of 0.5 to 2.5 mol/dm$^3$.

4. The nonaqueous electrolytic solution as defined in claim 1, wherein said nonaqueous solvent comprises two or more carbonate-based compounds.

5. The nonaqueous electrolytic solution of claim 4, wherein said two or more carbonate-based compounds are selected from the group consisting of ethylene carbonate, diethyl carbonate, methyl ethyl carbonate, dimethyl carbonate, propylene carbonate, and vinylene carbonate.

* * * * *